United States Patent
Schmidt et al.

(10) Patent No.: US 9,326,257 B2
(45) Date of Patent: Apr. 26, 2016

(54) SYSTEM AND METHOD FOR OPTIMIZING CHANNEL CHARACTERISTICS WHEN INITIALIZING LINKS BETWEEN COGNITIVE RADIOS IN A SHARED SPECTRUM ENVIRONMENT

(71) Applicant: Spectrum Bridge, Inc., Lake Mary, FL (US)

(72) Inventors: Jeffery C. Schmidt, Orlando, FL (US); Sekhar V. Uppalapati, Longwood, FL (US); Robin U. Roberts, Orlando, FL (US)

(73) Assignee: SPECTRUM BRIDGE, INC., Lake Mary, FL (US)

( * ) Notice: Subject to any disclaimer, the term of this patent is extended or adjusted under 35 U.S.C. 154(b) by 0 days.

(21) Appl. No.: 14/658,646

(22) Filed: Mar. 16, 2015

(65) Prior Publication Data
US 2015/0282147 A1 Oct. 1, 2015

Related U.S. Application Data

(60) Provisional application No. 61/970,540, filed on Mar. 26, 2014.

(51) Int. Cl.
| | |
|---|---|
| H04M 1/66 | (2006.01) |
| H04W 52/38 | (2009.01) |
| H04W 12/08 | (2009.01) |
| H04W 16/18 | (2009.01) |

(52) U.S. Cl.
CPC .............. *H04W 52/38* (2013.01); *H04W 12/08* (2013.01); *H04W 16/18* (2013.01)

(58) Field of Classification Search
CPC . H04W 72/0406; H04W 12/08; H04W 16/18; H04W 52/38

USPC ......... 455/411, 12.1, 406, 429, 458; 370/219, 370/241, 252, 326, 316, 325, 328, 350
See application file for complete search history.

(56) References Cited

U.S. PATENT DOCUMENTS

| | | | |
|---|---|---|---|
| 6,335,937 B1 | 1/2002 | Chao et al. | |
| 2010/0273500 A1* | 10/2010 | Dominguez Romero et al. | E06B 3/9642 455/452.2 |
| 2011/0250915 A1* | 10/2011 | Stanforth | H04W 16/14 455/509 |
| 2012/0039166 A1 | 2/2012 | Gao | |
| 2015/0264577 A1* | 9/2015 | Yang | H04W 16/14 370/252 |

OTHER PUBLICATIONS

International Search Report and Written Opinion (ISR/WO) from counterpart International Application No. PCT/US2015/020695 dated Jun. 26, 2015.

* cited by examiner

*Primary Examiner* — Dhaval Patel
(74) *Attorney, Agent, or Firm* — Tucker Ellis LLP

(57) ABSTRACT

Systems and methods to facilitate acquisition of specific operating parameters by a spoke radio device via a hub radio device while the hub radio device operates using specific operating parameters and the spoke radio device operates using generic operating parameters. The spoke radio device may acquire the generic operating parameters from a beacon broadcast by the hub radio device. If a link between a hub radio device and a spoke radio device cannot be satisfactorily established and maintained using the specific and generic operating parameters, respectively, then the hub radio device may use alternative channels and/or reduce its operational area to attempt to converge specific and generic transmit power levels for improved link establishment.

18 Claims, 5 Drawing Sheets

SYSTEM AND METHOD FOR OPTIMIZING CHANNEL CHARACTERISTICS WHEN INITIALIZING LINKS BETWEEN COGNITIVE RADIOS IN A SHARED SPECTRUM ENVIRONMENT

RELATED APPLICATION DATA

This application claims the benefit of U.S. Provisional Patent Application No. 61/970,540, filed Mar. 26, 2014, the disclosure of which is herein incorporated by reference in its entirety.

TECHNICAL FIELD OF THE INVENTION

The technology of the present disclosure relates generally to wireless communications and, more particularly, to a system and method for facilitating channel map acquisition in "spoke" radio devices that do not have a direct Internet connection. The channel map may be acquired through a "hub" radio device that does have an Internet connection. Channel characteristics, including channel selection, may be adapted to improve communication performance between the hub and spoke during channel map acquisition by the spoke.

BACKGROUND

Spectrum sharing is thought of as one of the most viable ways of improving the amount of spectrum available to wireless networks and other radio devices for conducting wireless communications. An exemplary spectrum sharing technique involves use of television white spaces under regulations set forth by an appropriate regulatory agency. An exemplary regulatory agency that regulates the use of wireless spectrum is the U.S. Federal Communications Commission (FCC). Other countries may have similar regulatory entities.

In the U.S., for example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space (or TVWS) but other types of white spaces are possible. In the case of TV white space, the white space is comprised of unused spectrum that is interleaved with spectrum used by incumbent radio devices in the channel 2 to channel 51 range (corresponding to 54 MHz to 698 MHz). Exemplary incumbent radio devices for TV white space include television broadcasters and other priority users of television channels.

Under FCC regulations, radio devices that use TVWS must register with a central database server (also referred to as a spectrum management server) and receive a channel list (also referred to as a channel map) of available channels for which the radio device may use in a shared environment with other TV band devices (TVBDs) while minimizing the possibility of creating undesirable interference to incumbent radio systems. The channel list that is generated for a radio device is generated by the central database server based on the location of the radio device. In this manner, the operation of incumbent radio devices having protected areas in which the radio device is located may be taken into account when determining channel availability.

Also, regulators and industry groups have proposed the use of geo-location database technology to control or manage spectrum access for radios in other situations. For example, use of geo-location database technology has been proposed for the 5 GHz UNII bands and for the 3.550 GHz to 3.650 GHz bands in which the U.S. government and military are incumbent users.

Outside the U.S., use of geo-location database technology has been proposed for TVWS bands in a number of countries. In the European Union (EU), TVWS sharing is often referred to as authorized shared access (ASA) and/or licensed shared access (LSA). Exemplary regulations for ASA/LSA are outlined in European Telecommunications Standards Institute (ETSI) EN 301 598. Other standards bodies have also proposed mechanisms for supporting spectrum sharing, such as the Internet Engineering Task Force's (IETF) Protocol to Access White Space (PAWS).

In cognitive radio ecosystems, such as the above-mentioned TV white space environment, it is common for a first radio device (e.g., a first TVBD) to establish wireless connectivity with a second radio device (e.g., a second TVBD). Under controlling regulations, the connectivity typically must be established without causing interference to primary, incumbent or other concurrent radio devices (collectively referred to as incumbent users).

An exemplary radio device involved in this situation may be a fixed-location TVDB device that is connected to the Internet over a medium that does not cause impermissible interference to another radio device. The medium over which Internet connectivity is made may be, for example, a terrestrial connection or a cellular connection. As will become clear from the following, this radio device may be considered a hub radio device due to its relationship with another radio device, which may be considered a spoke radio device.

The hub radio device may acquire a channel list from a geo-location database (also referred to a spectrum management server). The channel list authorizes the hub radio device to transmit on specified channels, at a specified location, at a maximum power, and for a specified period of time.

An issue arises when the spoke radio device (another TVBD in the example), which does not have independent access to the Internet, attempts to acquire a channel list from the geo-location database using a radio link established with the hub radio device as a pathway for Internet access. The two radio devices are considered hub and spoke radio devices due to their relationship with one another relative to the Internet connection.

Since the spoke radio device is in a different location than the hub radio device, an authorized channel list for the spoke radio device may not include an authorization for the same channel(s) used by the hub radio device. The channels used by the hub radio device may not be authorized for use by TVBDs, including the spoke radio device, in the location of the spoke radio device due to presence of an incumbent user with a protected boundary area that encompasses the location of the spoke radio device, but not the location of the hub radio device.

This is a dilemma. But, at least in the U.S., the Federal Communications Commission (FCC) considers this a special situation and allows limited use of the operational channel of the hub radio device by the spoke radio device under the following regulation set forth in 47 C.F.R. §15.711(e):

Fixed devices without a direct connection to the Internet. If a fixed TVBD does not have a direct connection to the Internet and has not yet been initialized and registered with the TV bands database consistent with §15.713, but can receive the transmissions of another fixed TVBD, the fixed TVBD needing initialization may transmit to that other fixed TVBD on either a channel that the other TVBD has transmitted on or on a channel which the other TVBD indicates is available for use to access the database to register its location and receive a list of channels that are available for it to use. Subsequently, the newly registered TVBD must only use the television channels that the database indicates are available for it to use. A fixed device may not obtain lists of available channels from another fixed device as provided by a TV bands database for such other device, i.e., a fixed device may not simply operate on the list of available channels provided by a TV bands database for another fixed device with which it communicates but must contact a database to obtain a list of available channels on which it may operate.

A consequence of this pragmatic methodology is the creation of a transient condition that might cause brief unintended interference to operations of incumbent users.

Other approaches may result in comparatively less transient interference in this situation. For example, certain regulations do not allow the flexibility of temporary communications that exceed certain transmit power thresholds. Unfortunately, these constraints have consequences that may promote unreliable or artificially hindered communications. As an example, European regulators have specified a situation in which a fixed device (e.g., the hub in the foregoing example) with a terrestrial connection to a database/server may acquire a "generic" channel authorization list and a "specific" channel authentication list. The specific channel authorization list allows normal use of the channel(s) in the list with other devices that also have specific authorization to use the channel(s). The "generic" channel authorization list allows communications with devices that do not have specific authorization, but these communications are more constrained.

The generic list of channels is the same as the specific list of channels, but includes a transmit power limit for each channel. The generic transmit power limit is the lowest authorized transmit power at any location in the hub's coverage area. When the spoke is operating in accordance with a generic channel authorization, regardless of its location in the coverage area of the hub, the spoke may not transmit with a power above the generic power limit for the relevant channel. The transmit power limit values may differ on a channel-by-channel basis.

More specifically, the area that includes the coverage area of the hub radio device is broken up into "pixels" where each pixel is a square unit area or some other predefined shape and area. The generic transmit power limit for each channel is determined by comparing the maximum allowable transmit power for every "pixel" overlapping with the coverage area and selecting the lowest value for the channel. This "lowest value" represents the maximum allowable transmit power for the channel that may be used by another non-specifically authorized device during communications with the hub (e.g., to use the hub as a pathway or proxy to obtain a channel list). To make other radio devices aware of the generic channel availability, the hub radio device broadcasts a beacon with a list of channels and an allowable transmit power for each channel in the list.

An exemplary channel list with generic operating parameters for the entirety of the hub's coverage area may be specified in a simple list format or in a table format with channel and transmit power entries (CH, TX POWER). An example is set forth in table 1.

TABLE 1

| Channel | Transmit Power |
|---------|----------------|
| CH 1    | 0 dBm          |
| CH 2    | 12 dBm         |
| .       | .              |
| .       | .              |
| .       | .              |
| CH 13   | 3 dBm          |

Under this approach, the spoke radio device may use the generic operational parameters specified in the beacon to communicate with the hub, including the generic transmit power as a maximum transmit power. By way of these communications and using the hub radio device as a communications pathway or proxy, the spoke radio device may request specific operational parameters (e.g., an authorized channel list) for the geographic location of the spoke radio device from the server hosting the geo-location database functions.

But, as shown in FIG. 1, it is likely that the specific operational parameters will be more favorable (i.e., allow higher transmit power) and enable a more reliable communications link than the generic parameters. FIG. 1 shows an exemplary hub radio device 10 and a coverage area 12 of the hub radio device 10. In the illustrated example, the coverage area 12 has a maximum range of about 10 miles (about 16 kilometers) from the location of the hub radio device 10. The geographic area that includes the coverage area 12 is divided into square-shaped pixels. In each pixel, a representative maximum allowable transmit power in dBm for the pixel is shown for a single channel. Also shown are two exemplary spoke radio devices 14a and 14b at different locations in the coverage area 12 of the hub radio device 10. In the illustrated example, the hub radio device 10 may be authorized to transmit at 30 dBm at its specific location. If it had specific channel authorization to use the channel of the illustrated example, the spoke radio device 14a also would be able to transmit at 30 dBm. But the lowest allowable transmit power in the exemplary coverage area 12, which occurs at the location of the spoke radio device 14b, is only 0 dBm. This lowest allowable transmit power represents the generic transmit power limit for the channel for the entire coverage area 12. Therefore, without specific authorization, the spoke radio device 14a in this example may communicate with the hub radio device 10 using a maximum transmit power of 0 dBm.

In this scenario, is that it is highly unlikely that the hub radio device 10 will receive transmitted data from the spoke radio devices 14a, 14b (e.g., a specific operating parameter request) since the transmit power of the spoke radio devices 14a, 14b is limited to be much less than the transmit power of the hub radio device 10. Signal reception will still be a problem even if the data rate is drastically reduced to increase link budget. Moreover, reducing the data rate further complicates the situation by requiring the hub radio device 10 to listen at varying data rates.

Another problem occurs if the hub radio device 10 and the spoke radio device 14a or 14b are able to initially establish and achieve reliable communications that enable the exchange and confirmation of specific operating parameters with higher allowable transmit power. Establishment of such a link might occur during quiet conditions, such as at night. But, from time to time, the hub radio device 10 may reacquire specific operating parameters due to a reboot or expiration of earlier specific operating parameters. In this case, further communications over the original link between the hub radio device 10 and the spoke radio device 14 may not be possible, thereby artificially inhibiting communications.

Still other issues arise in asymmetrical communication links. The hub radio device 10 may acquire a channel list with specific operating parameters for its specific location and acquire a channel list with generic operating parameters to be offered to spoke radio devices 14 that surround the hub radio device 10. Ideally, some channels in both the specific and generic lists will have similar and favorable operating parameters affording the opportunity to enable robust bi-directional communications between the hub radio device 10 and spoke radio devices 14. However, asymmetry between hub transmit power and spoke transmit power will often exist in this scenario. Link asymmetry can be tolerable and even normal in some systems in which sophisticated base stations utilize large, high gain antennas, extremely sensitive receivers and high power transmitters to accommodate low power, low cost mobile devices. An example of this type of system is cellular telephony where channel pairs are used for an uplink and a downlink in a frequency division multiplex (FDD) protocol. However, asymmetric link architecture is not the ideal scenario for low cost and less sophisticated radio systems, such as most TVBDs.

As indicated, to determine generic operating parameters, a geography-by-pixel and channel-based scheme may be used. An exemplary scheme of this nature that is used by cognitive radios is described in ETSI 301 598. This approach relies on a system in which the maximum allowable transmit power (per channel) is calculated for a grid (by pixel, e.g. 100 m×100 m) to ensure that devices do not cause interference with other radio devices or services. The maximum transmit power and other operational parameters for a location are determined based on radio propagation models and parameters, such as out of band emissions, antenna gain, antenna height, terrain, clutter, radio performance and other parameters. Table 2 contains a channel list with specific operating parameters and generic operating parameters that are generated for a hypothetical hub radio device under the approach described in ETSI 301 598.

TABLE 2

| Channel | Hub's Specific Operating Parameter - Maximum Allowable TX Power (dBm) | Spoke's Generic Operating Parameter - Maximum Allowable TX Power (dBm) |
|---|---|---|
| CH 1 | 15 | −10 |
| CH 2 | 19 | 10 |
| CH 3 | 2 | −38 |
| CH 4 | 13 | −21 |
| CH 5 | 17 | 15 |
| CH 6 | 12 | −17 |
| CH 7 | 25 | −18 |
| CH 8 | 7 | −23 |
| CH 9 | 19 | −24 |

In this example, choosing the best channel pair for bi-directional communications between the hub radio device 10 and the spoke radio device 14 is straightforward. The hub radio device 10 is authorized to operate at +17 dBm on channel 5 while the spoke radio device 14 (with undetermined location in the hub's coverage area 12) is concurrently allowed to operate at +15 dBm on the same channel. This enables both radios to operate almost symmetrically at relatively high power. However, if this choice did not exist, the selection is not as clear. Note, for example, that channel 7 permits the hub radio device 10 to operate at a relatively high power of +25 dBm, but the permitted transmit power for the spoke radio device 14 on channel 7 is −18 dBm. Such a low permitted transmit power for the spoke radio device 14 would lead to very poor performance and may not support communications. It may then be concluded that channel 2 is the next best choice where the specific operating parameter for the hub radio device 10 is 19 dBm and the generic operating parameter for the spoke radio device 14 is 10 dBm. But this is a 9 dB difference at lower transmit power for the spoke radio device 14 than allowed on channel 5.

The hub's coverage area 12, in terms of size and range, is directly proportional to transmit power. A good link budget translates to increased range, which has the effect of including more pixels in the generic parameter determination process. The inclusion of more pixels in the coverage area 12 increases the chance that the generic transmit power for a given channel (i.e., the worst case, or lowest, allowable transmit power for all pixels in the hub's coverage area), will be lower than for a smaller coverage area. As a result, asymmetric links between the hub radio device 12 and spoke radio devices 14 may result from the use of high specific transmit power by the hub and generic transmit power by the spoke(s).

DETAILED DESCRIPTION OF EMBODIMENTS

Figure 1:
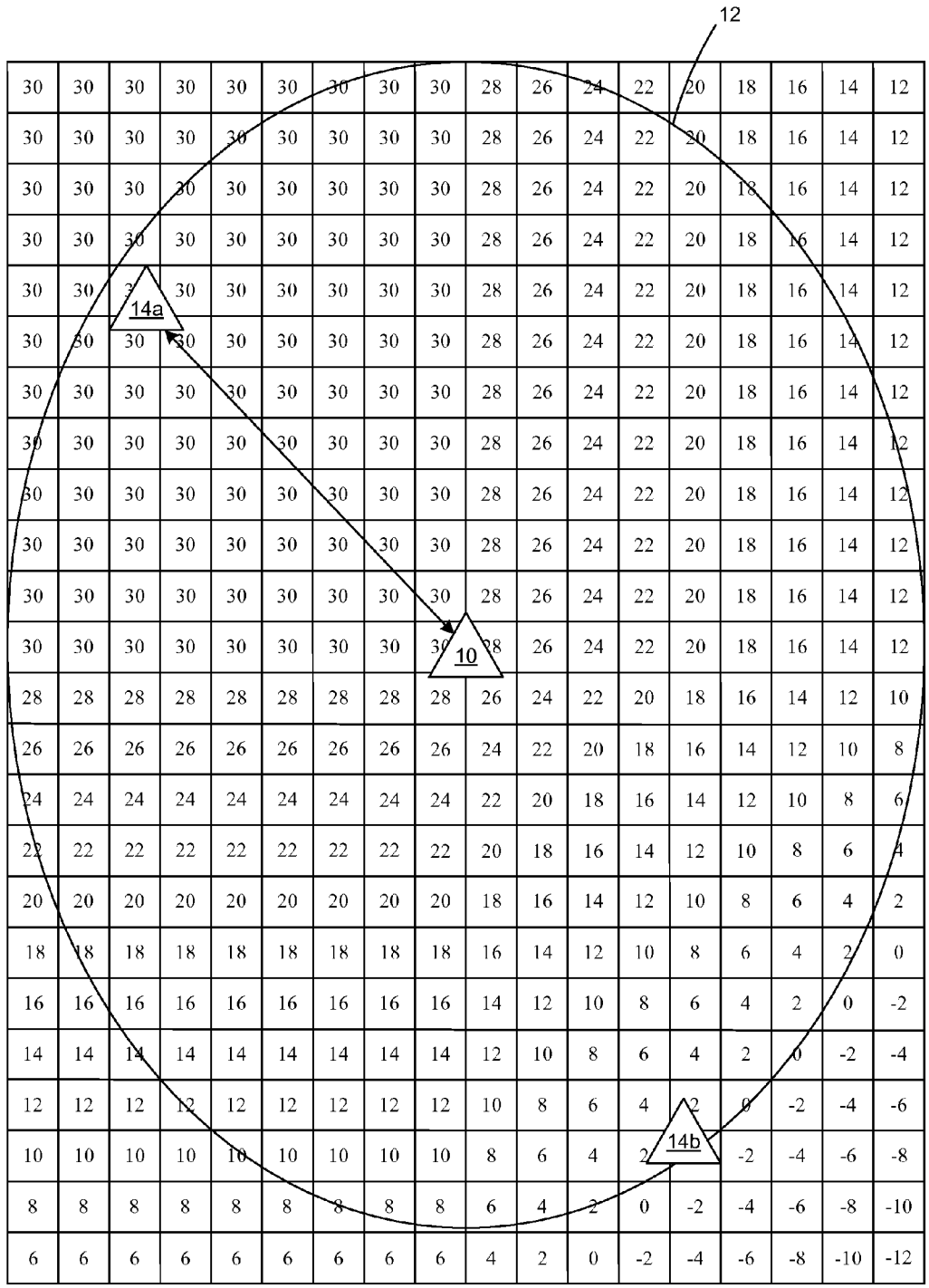
FIG. 1 is a schematic view of a representative spectrum environment in which generic channel authorizations are determined in a conventional manner.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Disclosed are systems and methods to facilitate acquisition of specific operating parameters by a spoke radio device via a hub radio device while the hub radio device operates using specific operating parameters and the spoke radio device operates using generic operating parameters. The spoke radio device may acquire the generic operating parameters from a beacon broadcast by the hub radio device. If a link between a hub radio device and a spoke radio device cannot be satisfactorily established and maintained using the specific and generic operating parameters, respectively, then the hub radio device may use alternative channels and/or reduce its operational area to attempt to converge specific and generic transmit power levels for improved link establishment.

Figure 2:
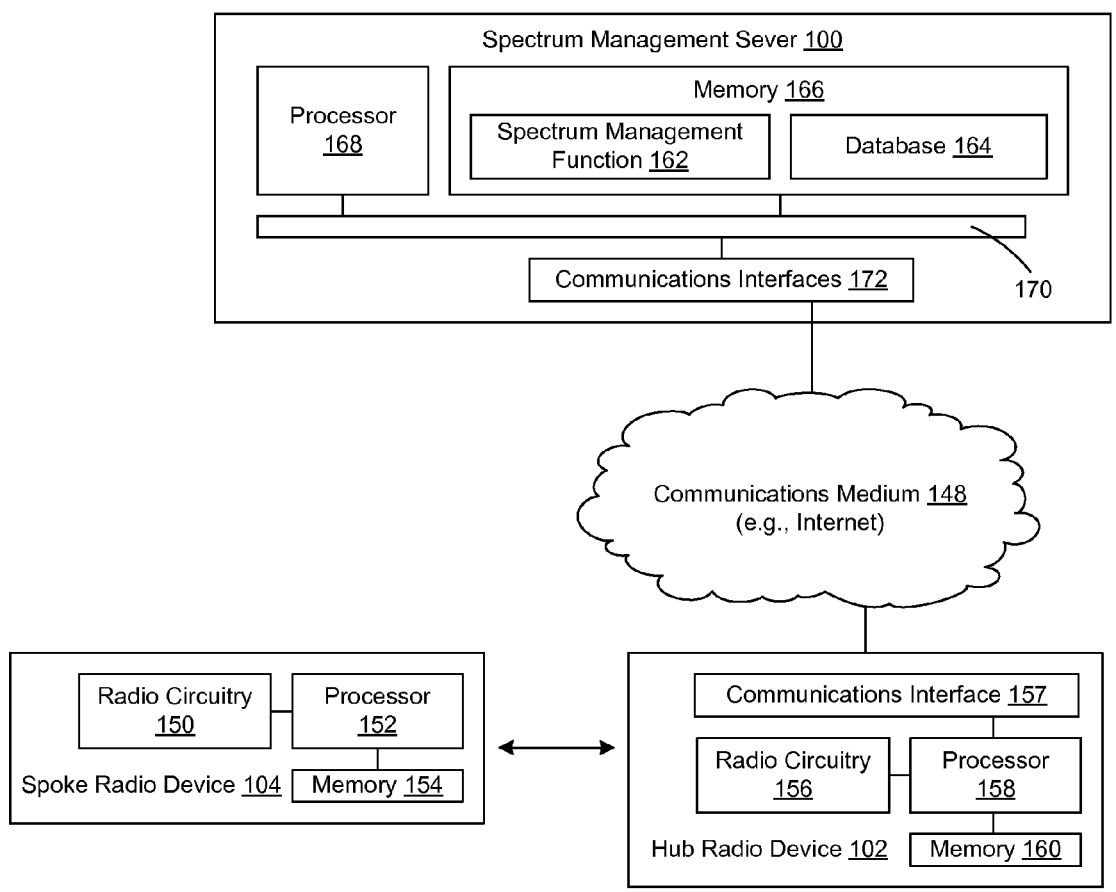
FIG. 2 is a schematic diagram of an exemplary system for facilitating channel map acquisition for spoke radio devices according to the present invention.

With reference to FIG. 2, shown is an exemplary system in which specific channel map acquisition for spoke radio devices that do not have a direct Internet connection is facilitated. The system includes a server 100, a hub radio device 102 and a spoke radio device 104. The hub and spoke radio devices 102, 104 may be TVBDs. Each of the server 100, the hub radio device 102 and the spoke radio device 104 are configured to carry out the respective logical functions that are described herein.

Figure 3A:
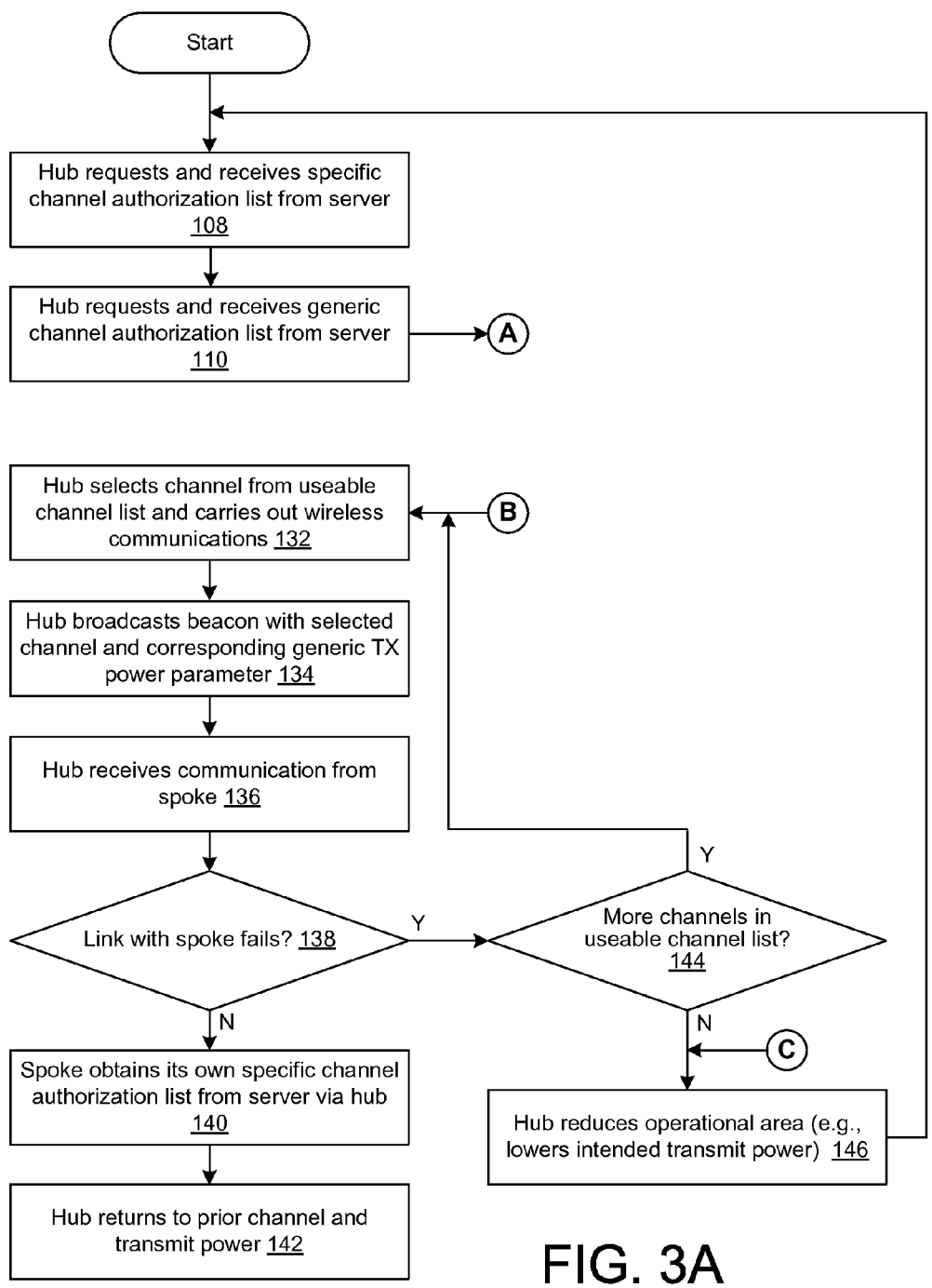
FIGS. 3A and 3B show a flow diagram of operations carried out in the system for the acquisition of channel authorizations.
Figure 3B:
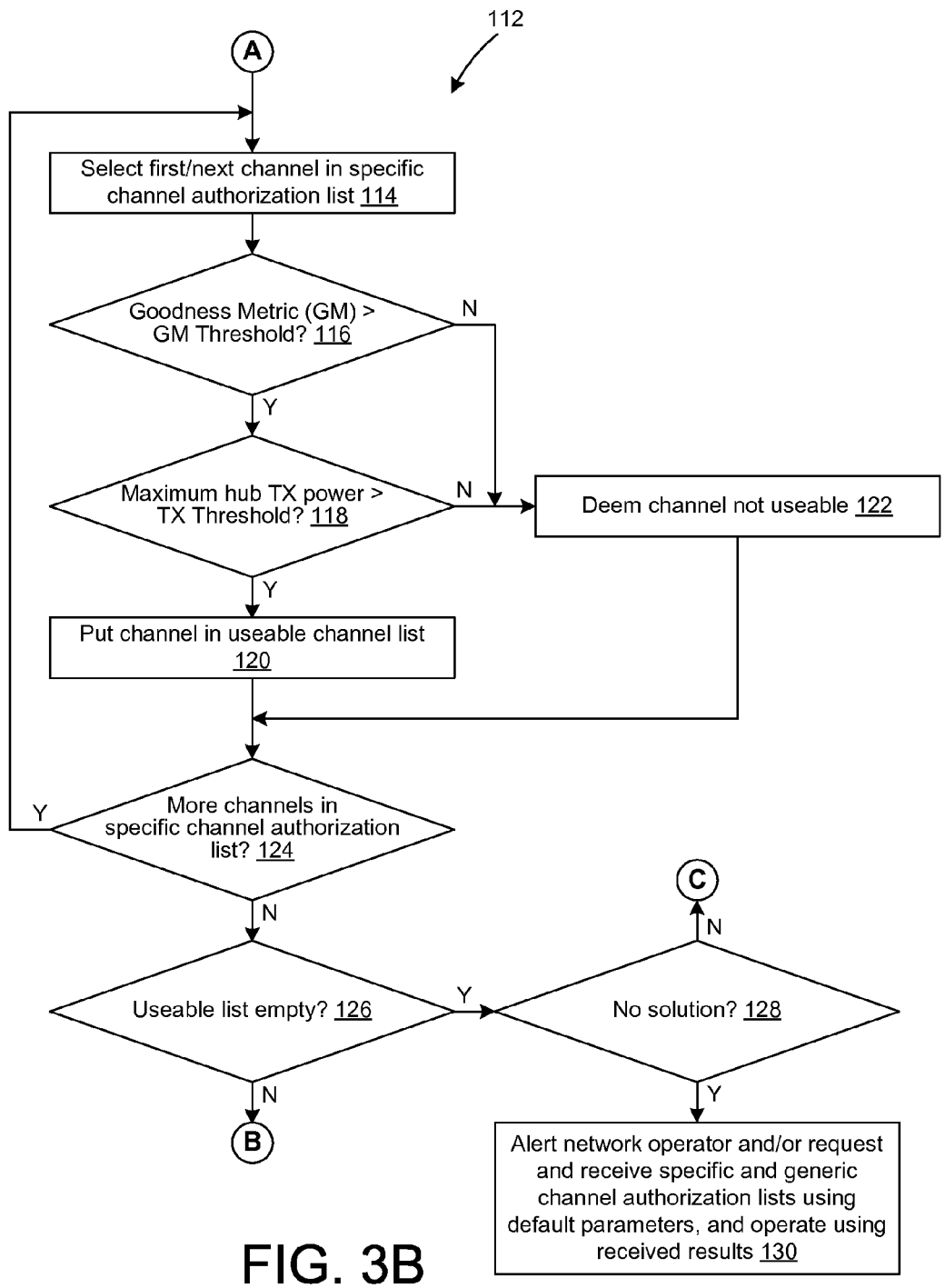

With additional reference to FIGS. 3A and 3B, illustrated are logical operations carried out by the server 100, the hub radio device 102 and the spoke radio device 104. Some of the operational blocks in the figures show an operation(s) carried out by one of the server 100, the hub radio device 102 or the spoke radio device 104. It will be understood that many of the operations also involve complimentary operations carried out by another one of the devices, even if those operations are not explicitly illustrated. Therefore, the flow diagram represents exemplary methods that may be respectively carried out by the server 100, the hub radio device 102 and the spoke radio device 104. The exemplary methods may be respectively carried out by cooperatively executing a software function in each of the server 100, the hub radio device 102 and the spoke radio device 104. Thus, the flow diagram may be thought of as depicting steps of one method carried out by the server 100, another method carried out by the hub radio device 102 and another method carried out by the spoke radio device 104. Although the flow chart shows a specific order of executing functional logic blocks, the order of executing the blocks may be changed relative to the order shown. Also, two or more blocks shown in succession may be executed concurrently or with partial concurrence. One or more blocks may be omitted. Also, logical operations may be implemented in a state-oriented manner and/or an object oriented manner.

The logical operations include steps to provide the hub radio device 102 with specific and generic operating parameters (e.g., a channel list (or lists) identifying available channels and, for each available channel, maximum transmit power for specific and generic operation). The hub radio device 102 may carry out wireless communications by transmitting using the specific operating parameters for a selected one of the available, specifically authorized channels. The hub radio device 102 also may broadcast the generic operating parameters in a beacon. The logical operations also include steps to provide the spoke radio device 104 with specific operating parameters. These steps include establishing a communication link between the hub radio device 102 and the spoke radio device 104 in which the spoke radio device 104 transmits with generic operating parameters found in the beacon. To improve link establishment and performance, the hub radio device 102 may adjust its operating parameters to reduce transmit power (which need not always be at the maximum allowable amount) and reduce the size of its coverage area.

Figure 4:
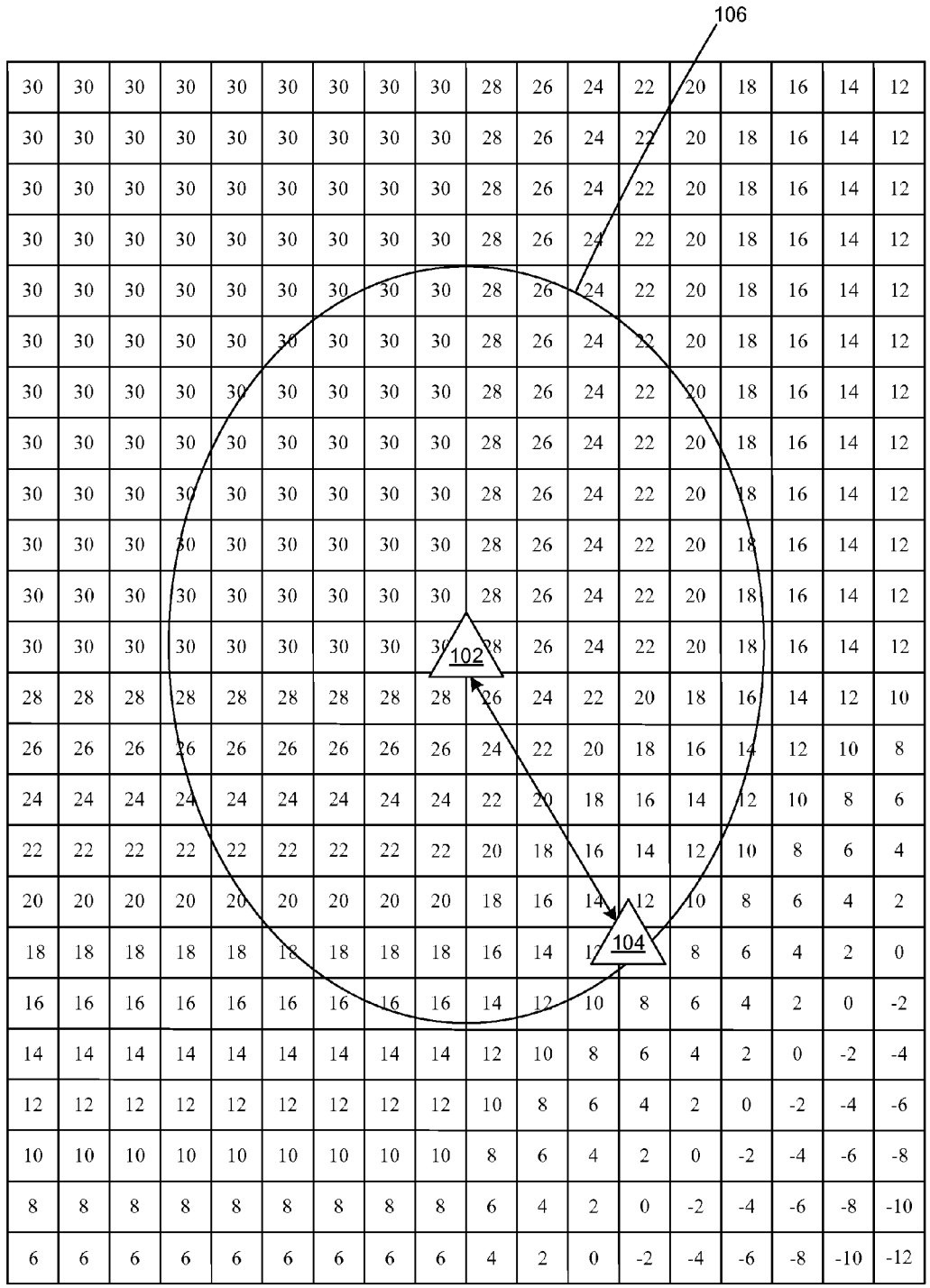
FIG. 4 is a schematic view of a representative spectrum environment in which generic channel authorizations are determined by the system of FIG. 2 in the course of carrying out the logical operations of FIGS. 3A and 3B.

By reducing the assumed transmit power of the hub radio device 102, the number of pixels in the corresponding coverage area 106 is reduced. Consequently, as the assumed transmit power of the hub radio device 102 is reduced, the generic transmit power per channel will generally increase. FIG. 4 illustrates the effect of reducing the coverage area of the hub radio device 102 by lowering the transmit power used by the hub radio device 102. FIG. 4 shows the same representative maximum allowable transmit power in dBm per pixel as shown in FIG. 1. However, since the size of the coverage area 106 is smaller, the generic transmit power limit increases from 0 dBm as found in the scenario of FIGS. 1 to 10 dBm for the scenario of FIG. 4 (e.g., 10 dBm being the lowest allowable transmit power for the entire coverage area 106, even though higher transmit power may be allowed in other locations in the coverage area 106). The improvement in generic operating parameter may, in turn, allow the hub's transmit power and the allowed generic transmit power to converge, which will typically result in an improved communication link between the hub radio device 102 and the spoke radio device 104. In the case of FIG. 4, the assumed transmit power of the hub was decreased from the example in FIG. 1 from +30 dBm to +15 dBm. Consequently, the worst case generic transmit power parameter increased from 0 dBm to +10 dBm. This effectively reduced the link asymmetry from 30 dBm (30 dBm-0 dBm) to 5 dBm (15 dBm-10 dBm).

The reduction in transmit power used by the hub radio device 102 may be carried out in an iterative process until a communications link with the spoke radio device 104 is established and the spoke radio device 104 acquires its own specific operating parameters. For each iteration of reducing transmit power, the hub radio device 102 may reacquire generic transmit power parameters and rebroadcast those parameters in the beacon for detection by the spoke radio device 104. In some cases, the hub radio device 102 may change its operational channel to another available channel to reduce transmit power and/or improve link establishment between the hub radio device 102 and the spoke radio device 104.

In one embodiment, once the spoke radio device 104 acquires specific operating parameters for its location, the hub radio device 102 may return to using the channel and transmit power that were used before receiving communications from the spoke radio device 104. In some cases, lowering the transmit power and decreasing the size of the coverage area 106 may result in the spoke radio device 104 failing to receive the beacon of the hub radio device 102. Thus, the spoke radio device 104 may stop attempting to communicate with the hub radio device 102. In this event, if the hub radio device 102 does not receive further communication from the spoke radio device 104 after a predetermined period of time from taking action to establish a communication link with the spoke radio device 104, then the hub radio device 102 may return to using the channel and transmit power that were used before receiving communications from the spoke radio device 104.

The logical flow may commence in block 108 where the hub radio device 102 requests and receives a specific channel authorization list from the server 100. As a complimentary operation, the server 100 receives the request, generates the specific channel authorization list containing available channels and corresponding maximum specific transmit power levels, and transmits the specific channel authorization list to the hub radio device 102. The specific channel authorization list is generated for the location of the hub radio device 102 and for one or more parameters contained in the request (or already known to the server 10). The parameters relating to the hub radio device 102 and considered by the server 100 when generating the specific channel authorization list may include, but are not limited to, antenna height, gain, and intended transmit power to establish a desired operational area. The desired operational area may be specified as a radius from the location of the hub radio device 102.

Next, in block 110, the hub radio device 102 requests and receives a generic channel authorization list from the server 100. As a complimentary operation, the server 100 receives the request, generates the generic channel authorization list containing available channels and corresponding maximum generic transmit power levels useable by spoke radio devices 104 in the coverage area of the hub radio device 102, and transmits the generic channel authorization list to the hub radio device 102. In another embodiment, the specific channel authorization list and the generic channel authorization list are not requested separately. Rather, the server 100 may generate and send both channel authorization lists in response to a request from the hub radio device 102.

The operations described in blocks 108 and 110 may be carried out when the hub radio device 102 is without a valid specific channel authorization list (e.g., a previously obtained specific channel authorization list has expired) or during an iteration of the logic flow as described in greater detail below.

Next, the hub radio device 102 carries out a channel evaluation routine 112, for which an exemplary embodiment is shown in FIG. 3B. In other embodiments, the channel evaluation routine 112 is performed by the server 100 and the results are communicated to the hub radio device 104 as part of the specific and/or generic channel authorization lists. The channel evaluation routine 112 may commence in block 114 where the hub radio device 102 selects one of the channels in the specific channel authorization list to evaluate. In block 116, the hub radio device 102 determines a predicted performance metric (also referred to as a "goodness metric" or "GM") for the channel selected in block 114 and compares the determined goodness metric to a predetermined goodness metric threshold. The goodness metric may be used to identify a preferred channel for conducting wireless communications. In one embodiment, the goodness metric is determined in a manner that accounts for and is a function of communication link symmetry that would occur if communications were carried out using the specific transmit power for the channel by the hub radio device 102 and using the generic transmit power for the channel by the spoke radio device 104. The goodness metric also may be implemented to provide results that are comparable against one another to determine the relative predicted performance of the available channels. Equation 1 sets forth an exemplary equation for determining the goodness metric for the channel selecting in block 114. In equation 1, alpha ($\alpha$) is a first coefficient, beta ($\beta$) is a second coefficient, Hub TX Power is the permitted transmit power for the hub radio device 102 (the specific transmit power), and Spoke TX Power is the permitted transmit power for the spoke radio device 104 (the generic transmit power).

$$GM = \alpha(\text{Hub } TX \text{ Power}) - \beta(\text{Hub } TX \text{ Power} - \text{Spoke } TX \text{ Power}) \quad \text{Eq. 1}$$

It is noted that the goodness metric from equation 1 is proportional to the spoke radio device 104 transmit power, especially if the two coefficients are set to the same value. Equation 1 sets forth one exemplary metric. Other metrics for predicting channel performance are possible, such as metrics that account for and optimize a link based on the factors of equation 1 and/or other factors, such as receive sensitivity or antenna gain.

A determination is made as to whether the determined goodness metric is greater than a predetermined goodness metric threshold. The predetermined goodness metric threshold may be selected to ensure that the channel has a minimum level of predicted performance. If the determined goodness metric exceeds the threshold, the logical routine progresses to block 118.

In block 118, the maximum hub radio device transmit power (i.e., the specific transmit power for the channel from the specific channel authorization list) is compared to a predetermined transmit power threshold. The predetermined transmit power threshold may be selected to ensure that the hub radio device 102 may transmit at least at a minimum power level. If the maximum hub radio device 102 transmit power exceeds the threshold, the logical routine progresses to block 120. In block 120, the channel is placed into a useable channel list.

If the goodness metric is less than the predetermined goodness metric threshold in block 116 or if the maximum hub radio device transmit power is less than the predetermined transmit power threshold in block 118, the logical flow will proceed to block 122. In block 122, the channel selected in block 114 is considered not useable and will be ignored in further process steps.

Following block 120 or block 122, the logical flow proceeds to block 124. In block 124, a determination is made as to whether all channels in the specific channel authorization list have been evaluated. If there are unevaluated channels, the logical flow returns to block 114 to select and evaluate another one of the available channels. If all of the channels have been evaluated, the logical flow will proceed to block 126.

In block 126, a determination is made as to whether the useable channel list contains at least one channel. If the useable channel list is empty, the logical flow proceeds to block 128. In block 128, a determination is made as to whether there is no channel use solution for the hub radio device 102. In one embodiment, lack of a channel use solution is indicated by no channels in the specific channel authorization list that have a maximum hub radio device transmit power that is greater than the predetermined transmit power threshold. In that instance, it may be concluded that there are no channels that would allow the hub radio device 102 to transmit with sufficient power to establish a desired coverage area. In other words, the coverage area for the channel in the specific channel authorization list with the highest maximum hub radio device transmit power would be too small to carry out desired wireless communications over a desired area. In another embodiment, the determination in block 128 is made by predicting the coverage area (or coverage radius) for each maximum hub radio device transmit power in the specific channel authorization list and determining if any of the coverage areas (or coverage radii) are greater than a predetermined minimum threshold.

If there is no channel use solution for the hub radio device 102, the logical flow may proceed to block 130. In block 130, an alert may be sent to the network operator of the hub radio device 102. Additionally, or alternatively, a specific channel authorization list and a generic channel authorization list may be obtained using a default set of operating parameters for the hub radio device 102 (e.g., parameters that specify a lower transmit power level or smaller desired coverage area than specified in the requests of blocks 108 and 110). The specific channel authorization list and the generic channel authorization list obtained with the default parameters then may be used by the hub radio device 102 to conduct wireless communications and the logical flow may end.

If the useable channel list is not empty in block 126 (i.e., contains at least one channel), then the channel evaluation routine 112 ends and the logical flow returns to the main process flow at block 132. In block 132, the hub radio device 132 selects a channel from the useable channel list to use for wireless communications. In one embodiment, the selected channel is the channel with the goodness metric value that is indicative of the highest level of predicted performance. If the values of the goodness metric for the channels are calculated using equation 1, for example, the hub radio device 102 may select the channel having the highest goodness metric value. In another embodiment, the hub radio device 102 may select the available channel that has the highest specific transmit power limit. In another embodiment, the hub radio device 102 may select the channel that has the highest combined (e.g., summed or weighted summed) specific transmit power limit and goodness metric. In still other embodiments, one or both of the specific transmit power limit and the goodness metric may be considered in combination with other factors, such as channel usage by other radio devices or networks.

The hub radio device 102 may carry out wireless communications with other radio devices using the selected channel. In one embodiment, the hub radio device 102 may transmit at the specific transmit power limit for the selected channel. However, this need not be the case and the hub radio device 102 may select a transmit power level that is less than the specific transmit power limit, such as to conserve power or for some other operational reason.

In block 134, the hub radio device 102 broadcasts a beacon that is detectable by spoke radio devices 104 near the hub radio device 102. The beacon contains the identity of the channel that is selected by the hub radio device 102 in block 132. The beacon also contains the generic transmit power limit for the selected channel.

If a spoke radio device 104 is without a specific channel authorization list, then the spoke radio device may attempt to establish a communication link with the hub radio device 102 for purposes of obtaining a specific channel authorization list from the server 100 via the hub radio device 102. In this event, the hub radio device 102 may receive communication from the spoke radio device 104 (e.g., a connection request) in block 136. In response to the communication of block 136, the hub radio device 102 and the spoke radio device 104 may attempt to establish a communication link. The communications involve the hub radio device 102 transmitting at a power level authorized under the specific transmit power limit (e.g., transmission may be at or below the specific transmit power limit) and the spoke radio device 104 transmitting at a power level authorized under the generic transmit power limit (e.g., transmission may be at or below the generic transmit power limit). As described, establishment of the communication link under these conditions may be problematic.

In block 138, a determination is made as to whether the establishment or maintenance of the communication link fails. Link failure may be indicated by a failure to close the communication link, by determining that a "bad" link exists (e.g., that the link has poor communication metrics, such as a low packet completion rate), or by the inability to improve the link to a higher data rate from an initial or low data rate.

If the communication link does not fail, the logical flow may proceed to block 140. In block 140, the spoke radio device 104 may obtain a specific channel authorization list for the location of the spoke radio device 104 from the server 100. As indicated, communication between the server 100 and the spoke radio device 104 may be carried out through the hub radio device 102. In other embodiments, the hub radio device 102 may serve as a proxy for the spoke radio device 104 during acquisition of the specific channel authorization list for the spoke radio device 104. Once the spoke radio device 104 obtains its specific channel authorization list, the spoke radio device 104 may select a channel from the specific channel authorization list and conduct wireless communications using the selected channel and corresponding specific transmit power limit.

As will be described, prior to successful establishment of a link between the hub radio device 102 and the spoke radio device 104, an iteration of the process flow may have resulted in a change to the channel and/or transmit power used by the hub radio device 102. If this occurs, then following block 140, the logical flow may proceed to block 142 where the hub radio device 102 may return to wireless operations using the channel and transmit power selected in the first iteration of block 132.

If the link fails in block 138, the logical flow may proceed to block 144. In block 144, a determination is made as to whether there are any other channels present in the useable channel list. If so, the logical flow may proceed back to block 132 where the hub radio device 102 selects another channel from the useable channel list. In this iteration, the hub radio device 102 may select the channel with the next lower goodness metric than the channel used in the prior iteration of the process flow. If selection criteria other than goodness metric is used in block 132 (e.g., specific transmit power limit), then the selection of the channel in block 132 may be made using the next lower selection criteria.

If, in block 144, there are no more channels in the useable channel list, then the logical flow may proceed to block 146. The logical flow also may proceed to block 146 following a negative determination in block 128 (FIG. 3B). In block 146, the hub radio device 102 may reduce its coverage area, such as by lowering the intended transmit power of the hub radio device 102. Thereafter, the logical flow may return to block 108 for the hub radio device 102 to obtain new specific and generic channel authorization lists. Requesting new specific and generic channel authorization lists is carried out since the channels and transmit powers in the specific and generic channel authorization lists may change as a result of the reduction in coverage area in block 146. Further, as indicated previously, conditions for establishment of a communication link between the hub radio device 102 and the spoke radio device 104 in block 138 may improve by a reduction in the size of the coverage area of the hub radio device 102. Therefore, it is contemplated that at least a temporary changes in operational parameters may improve the ability of the spoke radio device 104 to obtain a specific transmit power limit for the location of the spoke radio device 104.

The process that is shown and described in connection with FIGS. 3A and 3B iteratively improves link symmetry between the hub radio device 102 transmitting with a power allowed under a specific channel authorization and a spoke radio device 104 transmitting with a power allowed under a generic channel authorization. In this process, assumed transmit power for the hub radio device 102 may be reduced until the transmit power asymmetry between the hub radio device 102 and the spoke radio device 104 is reduced to achieve satisfactory performance.

In one embodiment, the hub's potential operating channels (e.g., channels determined to be available for use by the spectrum management server due to the lack of an incumbent user) are processed to determine symmetry between generic and specific parameters. If the potential link attainable by these parameters is relatively asymmetric (e.g., there is a relatively large difference between generic and specific parameters), the coverage area may be reduced to a smaller area and the allowable operating parameters are redetermined. This will create the tendency for the specific operating parameters and generic operating parameters to converge, facilitating a more symmetric link budget. The specific and generic transmit powers do not need to be equal. In one embodiment, an exemplary threshold difference between the specific and generic transmit powers may be 5 dBm. Other exemplary threshold differences include, but are not limited to, 7 dBm, 10 dBm and 12 dBm.

It will be understood that some of the described operations are carried out by the server 100, some of the operations are carried out by the hub radio device 102, and some of the operations are carried out by the spoke radio device 104. Tasks carried out by each device may be respectively considered a method carried out by that device. For these purposes, each of these devices includes appropriate control circuitry and/or processors and memory components. Logical instructions to carry out the respective processes may be embodied as software that is executed by the relevant device and that is stored on a non-transitory computer readable medium (e.g., computer memory) of the relevant device.

FIG. 2 is a schematic block diagram of an exemplary system for implementing the disclosed techniques. The hub radio device 102 may be or may include any type of electronic device that engages in wireless communications, such a computing device, an information and/or entertainment system, an Internet connectivity device (e.g., a modem and router) for other devices, etc. In a typical embodiment, the hub radio device 102 is a fixed-location device, but could be a mobile device, such as a mobile phone, tablet, etc. Similarly, the spoke radio device 104 may be or may include any type of fixed or mobile electronic device that engages in wireless communications, such a computing device, an information and/or entertainment system, a mobile phone, an Internet connectivity device for other devices, etc.

The server 100 communicates with the hub radio device 102 over any appropriate communications medium 148, such as one or more of the Internet, a cellular network, a WiFi network, a cable network, etc. In addition to carrying out the operations described herein, the server 100 may be a central white space registration system or some other form of spectrum management platform.

The spoke radio device 104 is location aware. For instance, the spoke radio device 104 may be capable of determining its position (also referred to as geo-location) using a location-determining technique, such as GPS or other technology. In some embodiments, the spoke radio device 104 may have a GPS receiver that is used to receive GPS satellite signals from which position coordinates are triangulated. Furthermore, if the spoke radio device 104 is a mobile device, it may be capable of manually or autonomously updating its determined position as it moves.

The spoke radio device 104 includes communications circuitry, such as radio circuitry 150. The radio circuitry 150 may include one or more radio modems (e.g., radio transceivers) and corresponding antenna assemblies to allow for communications over various types of network connections and/or protocols. The radio circuitry 150 may be used to carry out various wireless communications functions, including communicating with the hub radio device 102 using generic access credentials. The spoke radio device 104 may use the hub radio device 102 as a proxy to gain specific access credentials or may communicate with the server 100 via the hub radio device 102 to gain specific access credentials. Once specific access credentials are acquired by the spoke radio device 104, the spoke radio device 104 may engage in various communications functions such as, but not limited to, engaging in voice or video calls, and sending or receiving messages (e.g., email messages, text messages, multimedia messages, instant messages, etc.), accessing the Internet, transferring data (e.g., streaming video, obtaining or sending files), etc.

Overall functionality of the spoke radio device 104 may be controlled by a control circuit that includes a processing device 152. The processing device 152 may execute code that is stored in a memory 154. For instance, the processing device 152 may be used to execute an operating system and other applications that are installed on the spoke radio device 104. The operating system or applications may include executable logic to implement the functions of the spoke radio device 104 that are described herein. The memory 154 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 154 includes a non-volatile memory for long term data storage and a volatile memory that functions as system memory for the control circuit.

The spoke radio device 104 may include any other appropriate components such as, but not limited to, a display, a speaker, a microphone, a user interface (e.g., a keypad and/or a touch-sensitive input), motion sensors, etc.

Similar to the spoke radio device 104, the hub radio device 102 includes communications circuitry, such as radio circuitry 156. The radio circuitry 156 may include one or more radio modems (e.g., radio transceivers) and corresponding antenna assemblies to allow for communications over various types of network connections and/or protocols. The radio circuitry 156 may be used to carry out various wireless communications functions, including communicating with the spoke radio device. Also, using specific access credentials, the hub radio device 102 may engage in various communications functions such as, but not limited to, engaging in voice or video calls, and sending or receiving messages (e.g., email messages, text messages, multimedia messages, instant messages, etc.), accessing the Internet, transferring data (e.g., streaming video, obtaining or sending files), etc. The hub radio device 102 may include a communications interface 157 to establish communications with the communications medium 148. In one embodiment, the communications interface 157 may be part of the radio circuit 156, in which case the radio circuit 156 is considered to have at least one wireless interface and at least one interface to the communications medium 148.

Overall functionality of the hub radio device 102 may be controlled by a control circuit that includes a processing device 158. The processing device 158 may execute code that is stored in a memory 160. For instance, the processing device 158 may be used to execute an operating system and other applications that are installed on the hub radio device 102. The operating system or applications may include executable logic to implement the functions of the hub radio device 102 that are described herein. The memory 160 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 160 includes a non-volatile memory for long term data storage and a volatile memory that functions as system memory for the control circuit.

The hub radio device 102 may include any other appropriate components such as, but not limited to, a display, a speaker, a microphone, a user interface (e.g., a keypad and/or a touch-sensitive input), motion sensors, etc.

The server 100 may be implemented as a computer-based system that is capable of executing computer applications (e.g., software programs), including a spectrum management function 162 that, when executed, carries out functions of the server 100 that are described herein. The spectrum management function 162 and a database 164 may be stored on a non-transitory computer readable medium, such as a memory 166. The database 164 may be used to store various information sets used to carry out the functions described in this disclosure. For instance, the server 100 may store or access data about known protected radio devices. The memory 166 may be a magnetic, optical or electronic storage device (e.g., hard disk, optical disk, flash memory, etc.), and may comprise several devices, including volatile and non-volatile memory components. Accordingly, the memory 166 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the server 100 may include one or more processors 168 used to execute instructions that carry out logic routines. The processor 168 and the memory 166 may be coupled using a local interface 170. The local interface 170 may be, for example, a data bus with accompanying control bus, a network, or other subsystem.

The server 100 may have various input/output (I/O) interfaces for operatively connecting to various peripheral devices, as well as one or more communications interfaces 172. The communications interface 172 may include for example, a modem and/or a network interface card. The communications interface 172 may enable the server 100 to send and receive data signals, voice signals, video signals, and the like to and from other computing devices via an external network. In particular, the communications interface 172 may operatively connect the server 100 to the communications medium 148.

In one embodiment, the server 100 may be configured to host the above-described services for a plurality of electronic devices, including the hub and spoke radio devices 102, 104. In some embodiments, the services may include spectrum management functions, such as providing channel lists, specific channel access credentials and/or generic channel access credentials to qualified radio devices upon registration so as to allow the radio devices to make use of spectrum for wireless communications. Also, while the providing of services may be fully automated, the server 100 may host an Internet-style website for the various corresponding parties to conduct initial enrollment with the server 100, conduct manual registration if needed, access various tools and reports supplied by the server 100, and so forth. For supplying the services, the server 100 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

In embodiments of this disclosure, the server 100 may undertake spectrum management functions other than those that are described in detail, such as responding to white space channel list requests with appropriate channel lists. Therefore, in some embodiments, the server 100 may be considered a central spectrum "database" or white space registration/allocation system.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with licensed channels. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

Although certain embodiments have been shown and described, it is understood that equivalents and modifications falling within the scope of the appended claims will occur to others who are skilled in the art upon the reading and understanding of this specification.

What is claimed is:

1. A hub radio device through which a spoke radio device acquires wireless spectrum access credentials from a server, comprising:
   a wireless communications interface over which wireless communications are carried out; and
   a control circuit that executes logical instructions to:
      receive specific and generic channel authorizations from the server and select a channel from the specific channel authorization for use in wireless communications;
      determine if a first communication link between the spoke radio device and the hub radio device over the wireless communications interface fails in terms of link establishment or maintenance, during attempted establishment or maintenance of the first communication link the hub radio device uses a transmit power allowed under the specific channel authorization and the spoke radio device uses a transmit power allowed under the generic channel authorization;
      in response to the determination of the failure of the first communication link, reduce a coverage area of the hub radio device, reacquire the specific and generic channel authorizations issued to the hub radio device by the server for the reduced coverage area, use a channel and transmit power allowed under the reacquired specific channel authorization and broadcast corresponding reacquired generic channel authorization in a beacon; and
      establishing a second communication link between the spoke radio device and the hub radio device for which the hub radio device uses a channel and transmit power allowed under the reacquired specific channel authorization and the spoke radio device uses a transmit power allowed under the reacquired generic channel authorization, and the spoke radio device obtains the wireless spectrum access for the spoke radio device from the server via the second communication link.

2. The hub radio device of claim 1, wherein the generic transmit power for the channel is a lowest allowable transmit power for a non-specifically authorized device anywhere in a coverage area of the hub radio device.

3. The hub radio device of claim 1, wherein the reduction in coverage area corresponds to a reduction in hub transmit power and to a convergence of the hub transmit power with allowable generic transmit power under the generic channel authorization.

4. The hub radio device of claim 1, wherein operating channels selected by the hub radio device from the specific channel authorization and the reacquired specific channel authorization meet minimum operational criteria.

5. The hub radio device of claim 4, wherein the minimum operational criteria comprises exceeding a minimum transmit power threshold.

6. The hub radio device of claim 4, wherein the minimum operational criteria comprises exceeding a minimum predicted performance metric.

7. The hub radio device of claim 6, wherein the minimum operational criteria is determined as a function of communication link symmetry between the hub radio device and the spoke radio device.

8. The hub radio device of claim 7, wherein the minimum operational criteria is determined in accordance with the following equation in which α is a first coefficient, β is a second coefficient, Hub TX Power is the specific transmit power for the hub radio device and Spoke TX Power is the generic transmit power for the spoke radio device 104:

$$GM=\alpha(\text{Hub TX Power})-\beta(\text{Hub TX Power}-\text{Spoke TX Power}).$$

9. The hub radio device of claim 1, wherein after the spoke radio device acquires the wireless spectrum access from the server, the hub radio device returns to using the channel and transmit power used when the first communication link failed.

10. A hub radio device through which a spoke radio device acquires wireless spectrum access credentials from a server, comprising:
a wireless communications interface over which wireless communications are carried out; and
a control circuit that executes logical instructions to:
receive specific and generic channel authorizations from the server and select a channel from the specific channel authorization for use in wireless communications;
determine if a first communication link between the spoke radio device and the hub radio device over the wireless communications interface fails in terms of link establishment or maintenance, during attempted establishment or maintenance of the first communication link the hub radio device uses a transmit power allowed under the specific channel authorization and the spoke radio device uses a transmit power allowed under the generic channel authorization;
determine if the specific channel authorization contains an alternative channel that meets minimum operational criteria and, if so, switch operational channels and broadcast corresponding generic channel authorization in a beacon; and
establishing a second communication link between the spoke radio device and the hub radio device for which the hub radio device uses the alternative channel and a corresponding transmit power allowed under the specific channel authorization and the spoke radio device uses a transmit power allowed under the generic channel authorization, and the spoke radio device obtains the wireless spectrum access for the spoke radio device from the server via the second communication link.

11. The hub radio device of claim 10, wherein if the specific channel authorization does not contain an alternative channel that meets minimum operational criteria, then reduce a coverage area of the hub radio device, reacquire the specific and generic channel authorizations issued to the hub radio device by the server for the reduced coverage area, use a channel and transmit power allowed under the reacquired specific channel authorization and broadcast corresponding reacquired generic channel authorization in a beacon.

12. The hub radio device of claim 11, wherein the reduction in coverage area corresponds to a reduction in hub transmit power and to a convergence of the hub transmit power with allowable generic transmit power under the generic channel authorization.

13. The hub radio device of claim 10, wherein the generic transmit power for the channel is a lowest allowable transmit power for a non-specifically authorized device anywhere in a coverage area of the hub radio device.

14. The hub radio device of claim 10, wherein the minimum operational criteria comprises exceeding a minimum transmit power threshold.

15. The hub radio device of claim 10, wherein the minimum operational criteria comprises exceeding a minimum predicted performance metric.

16. The hub radio device of claim 15, wherein the minimum operational criteria is determined as a function of communication link symmetry between the hub radio device and the spoke radio device.

17. The hub radio device of claim 16, wherein the minimum operational criteria is determined in accordance with the following equation in which α is a first coefficient, β is a second coefficient, Hub TX Power is the specific transmit power for the hub radio device and Spoke TX Power is the generic transmit power for the spoke radio device 104:

$$GM=\alpha(\text{Hub TX Power})-\beta(\text{Hub TX Power}-\text{Spoke TX Power}).$$

18. The hub radio device of claim 10, wherein after the spoke radio device acquires the wireless spectrum access from the server, the hub radio device returns to using the channel and transmit power used when the first communication link failed.

* * * * *